US012759814B2

(12) United States Patent
Zhou et al.

(10) Patent No.: US 12,759,814 B2
(45) Date of Patent: Oct. 13, 2026

(54) MATERIAL CONVEYING METHOD AND DEVICE

(71) Applicants: SHENZHEN KUBO SOFTWARE CO., LTD, Shenzhen (CN); HAI ROBOTICS CO., LTD., Shenzhen (CN)

(72) Inventors: Hongxia Zhou, Shenzhen (CN); Kailei Zhu, Shenzhen (CN)

(73) Assignees: SHENZHEN KUBO SOFTWARE CO., LTD, Shenzhen (CN); HAI ROBOTICS CO., LTD., Shenzhen (CN)

( * ) Notice: Subject to any disclaimer, the term of this patent is extended or adjusted under 35 U.S.C. 154(b) by 497 days.

(21) Appl. No.: 18/475,897

(22) Filed: Sep. 27, 2023

(65) Prior Publication Data

US 2024/0017942 A1 Jan. 18, 2024

Related U.S. Application Data

(63) Continuation of application No. PCT/CN2022/081006, filed on Mar. 15, 2022.

(30) Foreign Application Priority Data

Mar. 31, 2021 (CN) ......................... 202110352761.3

(51) Int. Cl.
*B65G 65/00* (2006.01)
*B65G 65/02* (2006.01)

(52) U.S. Cl.
CPC ........... *B65G 65/005* (2013.01); *B65G 65/02* (2013.01)

(58) Field of Classification Search
CPC ...... B65G 65/005; B65G 65/02; B65G 1/023; B65G 1/04; B65G 47/74
See application file for complete search history.

(56) References Cited

U.S. PATENT DOCUMENTS

2011/0130869 A1 6/2011 Linge
2017/0174431 A1 6/2017 Borders et al.
2020/0209865 A1* 7/2020 Jarvis ...................... B66F 9/063

FOREIGN PATENT DOCUMENTS

CN 205471032 U 8/2016
CN 106144421 A 11/2016
(Continued)

OTHER PUBLICATIONS

Office action in Chinese patent application No. 202110352761.3, issued on Apr. 12, 2023.
(Continued)

*Primary Examiner* — Jacob S. Scott
(74) *Attorney, Agent, or Firm* — Ladas & Parry, LLP

(57) ABSTRACT

This application provides a material conveying method and device, applicable to an unloading device including a robot and a conveyor. The robot includes at least one goods taking or placing apparatus and at least two first storage layers, and the conveyor includes a to-be-placed goods conveying layer and a to-be-taken goods conveying layer arranged in parallel from up to down. According to this application, the goods taking or placing apparatus is controlled to move in a direction perpendicular to the to-be-placed goods conveying layer and the to-be-taken goods conveying layer. When a material obtained from the to-be-taken goods conveying layer exists on the goods taking or placing apparatus, the goods taking or placing apparatus is controlled to place the material on an unoccupied storage layer reached by the goods taking or placing apparatus for the first time during the movement.

20 Claims, 6 Drawing Sheets

(56) References Cited

FOREIGN PATENT DOCUMENTS

| | | | | | |
|---|---|---|---|---|---|
| CN | 106379681 | A | | 2/2017 | |
| CN | 106927179 | A | | 7/2017 | |
| CN | 108001922 | A | | 5/2018 | |
| CN | 108313606 | A | | 7/2018 | |
| CN | 108382880 | A | * | 8/2018 | ............... B65G 1/04 |
| CN | 108778960 | A | | 11/2018 | |
| CN | 109018809 | A | | 12/2018 | |
| CN | 109760984 | A | * | 5/2019 | |
| CN | 110270973 | A | | 9/2019 | |
| CN | 209536108 | U | | 10/2019 | |
| CN | 110789902 | A | | 2/2020 | |
| CN | 210213640 | U | * | 3/2020 | |
| CN | 111137610 | A | | 5/2020 | |
| CN | 111169892 | A | | 5/2020 | |
| CN | 111470235 | A | | 7/2020 | |
| CN | 211197464 | U | | 8/2020 | |
| CN | 111620024 | A | | 9/2020 | |
| CN | 211593843 | U | | 9/2020 | |
| CN | 111792260 | A | | 10/2020 | |
| CN | 111891615 | A | | 11/2020 | |
| CN | 111977244 | A | * | 11/2020 | ........... B65G 1/1371 |
| CN | 212355263 | U | * | 1/2021 | |
| CN | 113071840 | A | | 7/2021 | |
| CN | 113071846 | A | | 7/2021 | |
| CN | 215045876 | U | | 12/2021 | |
| JP | H03-13405 | A | | 1/1991 | |
| JP | H031340 | | * | 1/1991 | |
| JP | 2020508274 | A | | 3/2020 | |
| TW | 201825366 | A | | 7/2018 | |
| TW | 202003354 | A | | 1/2020 | |
| WO | WO2012032865 | A1 | | 3/2012 | |
| WO | WO-2022206263 | A1 | * | 10/2022 | ........... B65G 1/1376 |

OTHER PUBLICATIONS

Office action in Taiwanese patent application No. 111107821, issued on Sep. 26, 2023.

Office action in Taiwanese patent application No. 111112160, issued on Nov. 22, 2023.

Supplementary European Search Report in EP patent application No. 22778558.1, issued on Jul. 4, 2024.

Office action in Japanese patent application No. 2023-560747, issued on Dec. 3, 2024.

Office action and search report in Chinese patent application No. 202311312518.4, issued on Jul. 18, 2025.

International Search Report for PCT/CN2022/081006 mailed Jun. 8, 2022.

* cited by examiner

MATERIAL CONVEYING METHOD AND DEVICE

CROSS-REFERENCE TO RELATED APPLICATIONS

This application is a continuation of International Patent Application No. PCT/CN2022/081006 filed on Mar. 15, 2022, which claims priority to Chinese Patent Application No. 202110352761.3, filed with the China National Intellectual Property Administration on Mar. 31, 2021 and entitled "MATERIAL CONVEYING METHOD AND DEVICE", which is incorporated herein by reference in its entirety.

TECHNICAL FIELD

Embodiments of this application relate to the field of material carrying technologies, and in particular, to a material conveying method and device.

BACKGROUND

Intelligent warehousing is an important part of a logistics process. A robot can carry materials in replacement of a human and play an important role in the intelligent warehousing.

The robots can place the materials on a conveyor and convey the materials to a workstation through the conveyor. An operator in the workstation sorts the materials, the conveyor conveys the sorted materials from the workstation to a goods taking position, and the robot takes the materials from a goods taking position.

Therefore, in the conveying process of materials between the robot and the conveyor, shortening the movement distance of the goods taking or placing apparatus on the robot becomes an urgent problem to be solved.

SUMMARY

Embodiments of this application provide a material conveying method and device, to shorten a movement distance of a goods taking or placing apparatus on a robot.

According to a first aspect, an embodiment of this application provides a material conveying method, applicable to an unloading device. The unloading device includes: a robot and a conveyor, where the robot includes at least one goods taking or placing apparatus and at least two first storage layers, and the conveyor includes a to-be-placed goods conveying layer and a to-be-taken goods conveying layer arranged in parallel from up to down; and the method includes:

controlling the goods taking or placing apparatus to move in a direction perpendicular to the to-be-placed goods conveying layer and the to-be-taken goods conveying layer; and controlling, when a material obtained from the to-be-taken goods conveying layer exists on the goods taking or placing apparatus, the goods taking or placing apparatus to place the material on an unoccupied storage layer reached by the goods taking or placing apparatus for the first time during the movement.

Optionally, the method further includes:

when no material exists on the at least one goods taking or placing apparatus, at least one unoccupied storage layer exists in the at least two first storage layers, and a material exists on the to-be-taken goods conveying layer, controlling a goods taking or placing apparatus to take the material from the to-be-taken goods conveying layer.

Optionally, the method further includes:

controlling a goods taking or placing apparatus to take a material from a target material layer reached for the first time during the movement when no material exists on the goods taking or placing apparatus, wherein the target material layer is the first storage layer or the to-be-taken goods conveying layer.

Optionally, the controlling the goods taking or placing apparatus to take the material from a target material layer reached for the first time during the movement when no material exists on the goods taking or placing apparatus includes:

controlling the goods taking or placing apparatus to take a material from the first storage layer reached for the first time during the movement when no material exists on the goods taking or placing apparatus and no unoccupied storage layer exists in the at least two first storage layers.

Optionally, the method further includes:

controlling, when a material obtained from the first storage layer exists on a goods taking or placing apparatus, the goods taking or placing apparatus to place the material on the to-be-placed goods conveying layer.

Optionally, the storage layer reached by the goods taking or placing apparatus for the first time during the movement is a to-be-taken material storage layer, and a to-be-taken material exists on the to-be-taken material storage layer.

Optionally, the controlling the goods taking or placing apparatus to move in a direction perpendicular to the to-be-placed goods conveying layer and the to-be-taken goods conveying layer includes:

controlling the at least one goods taking or placing apparatus to alternately move in a first vertical direction and a second vertical direction, wherein the movement in the first vertical direction comprises moving from a start storage layer to an end storage layer, and the movement in the second vertical direction comprises moving from the end storage layer to the start storage layer, wherein in an initial state, the start storage layer is an uppermost layer of the at least two first storage layers, and the end storage layer is a lowermost layer of the at least two first storage layers; and respectively updating the start storage layer and the end storage layer to an uppermost layer and a lowermost layer of a to-be-taken material storage layer after the material is placed on one of the first storage layers, wherein a to-be-taken material exists on the to-be-taken material storage layer.

Optionally, a temporary shelving unit is further arranged beside the conveyor, at least one second storage layer is arranged on the temporary shelving unit, and the at least one second storage layer is configured for the material taken from the to-be-taken goods conveying layer to be placed.

Optionally, the method further includes:

when a material exists on the to-be-taken goods conveying layer, no unoccupied storage layer exists in the at least two first storage layers, and an unoccupied storage layer exists in the second storage layers, controlling a goods taking or placing apparatus to take the material from the to-be-taken goods conveying layer and place the material on the unoccupied storage layer in the second storage layers.

Optionally, the method further includes:

when no material exists on the to-be-taken goods conveying layer, an unoccupied storage layer exists in the at least two first storage layers, and a material exists on the at least one second storage layer, controlling a goods taking or placing apparatus to take the material from the second storage layer and place the material on the unoccupied storage layer in the first storage layers.

Optionally, the method further includes:

when a material exists on the to-be-taken goods conveying layer and an unoccupied storage layer exists in the at least two first storage layers, controlling a goods taking or placing apparatus to take the material from the to-be-taken goods conveying layer and place the material on the unoccupied storage layer in the first storage layers.

According to a second aspect, an embodiment of this application provides an unloading device, including: a robot, a conveyor, and a controller, where the robot includes at least one goods taking or placing apparatus and at least two first storage layers, and the conveyor includes a to-be-placed goods conveying layer and a to-be-taken goods conveying layer arranged in parallel from up to down.

The controller is configured to: control the goods taking or placing apparatus to move in a direction perpendicular to the to-be-placed goods conveying layer and the to-be-taken goods conveying layer, and control, when a material obtained from the to-be-taken goods conveying layer exists on the goods taking or placing apparatus, the goods taking or placing apparatus to place the material on an unoccupied storage layer reached by the goods taking or placing apparatus for the first time during the movement.

Optionally, the controller is further configured to:

control, when no material exists on the goods taking or placing apparatus, at least one unoccupied storage layer exists in the at least two first storage layers, and a material exists on the to-be-taken goods conveying layer, the goods taking or placing apparatus to take the material from the to-be-taken goods conveying layer.

Optionally, the controller is further configured to:

control the goods taking or placing apparatus to take a material from a target material layer reached for the first time during the movement when no material exists on the goods taking or placing apparatus, where the target material layer is the first storage layer or the to-be-taken goods conveying layer.

Optionally, when the target material layer is the first storage layer, the controller is further configured to:

control the goods taking or placing apparatus to take a material from the first storage layer reached for the first time during the movement when no material exists on the goods taking or placing apparatus and no unoccupied storage layer exists in the at least two first storage layers.

Optionally, the controller is further configured to:

control, when a material obtained from the first storage layer exists on the goods taking or placing apparatus, the goods taking or placing apparatus to place the material on the to-be-placed goods conveying layer.

Optionally, the storage layer reached by the goods taking or placing apparatus for the first time during the movement is a to-be-taken material storage layer, and a to-be-taken material exists on the to-be-taken material storage layer.

Optionally, the controller is further configured to:

control the goods taking or placing apparatus to alternately move in a first vertical direction and a second vertical direction, where the movement in the first vertical direction includes: moving from a start storage layer to an end storage layer, and the movement in the second vertical direction includes: moving from the end storage layer to the start storage layer, where in an initial state, the start storage layer and the end storage layer are respectively an uppermost layer and a lowermost layer of the at least two first storage layers; and respectively update the start storage layer and the end storage layer to an uppermost layer and a lowermost layer of a to-be-taken material storage layer after the material is placed on one of the first storage layers, where a to-be-taken material exists on the to-be-taken material storage layer.

Optionally, a temporary shelving unit is further arranged beside the conveyor, at least one second storage layer is arranged on the temporary shelving unit, and the second storage layer is configured for the material taken from the to-be-taken goods conveying layer to be placed.

Optionally, the controller is further configured to:

control, when a material exists on the to-be-taken goods conveying layer, no unoccupied storage layer exists in the at least two first storage layers, and an unoccupied storage layer exists in the second storage layers, the goods taking or placing apparatus to take the material from the to-be-taken goods conveying layer and place the material on the unoccupied storage layer in the second storage layers.

Optionally, the controller is further configured to:

control, when no material exists on the to-be-taken goods conveying layer, an unoccupied storage layer exists in the at least two first storage layers, and a material exists on the at least one second storage layer, the goods taking or placing apparatus to take the material from the second storage layer and place the material on the unoccupied storage layer in the first storage layers.

Optionally, the controller is further configured to:

control, when a material exists on the to-be-taken goods conveying layer and an unoccupied storage layer exists in the at least two first storage layers, the goods taking or placing apparatus to take the material from the to-be-taken goods conveying layer and place the material on the unoccupied storage layer in the first storage layers.

According to a third aspect, an embodiment of this application provides a computer-readable storage medium. The computer-readable storage medium stores a computer-executable instruction, the computer-executable instruction, when executed by a processor, causing a computing device to implement the method according to the first aspect.

According to a fourth aspect, a computer program is provided. The computer program is configured to implement the method according to the first aspect.

The material conveying method and device provided in the embodiments of this application are applicable to an unloading device that includes a robot and a conveyor. The robot includes at least one goods taking or placing apparatus and at least two first storage layers, and the conveyor includes a to-be-placed goods conveying layer and a to-be-taken goods conveying layer arranged in parallel from up to down. According to the embodiments of this application, the goods taking or placing apparatus may be controlled to move in a direction perpendicular to the to-be-placed goods conveying layer and the to-be-taken goods conveying layer. When a material obtained from the to-be-taken goods conveying layer exists on the goods taking or placing apparatus, the goods taking or placing apparatus is controlled to place the material on an unoccupied storage layer reached by the goods taking or placing apparatus for the first time during the movement. Upon completion of placement of the goods on the first storage layers, the robot immediately leaves the conveyor or waits for a period of time before leaving. In this way, an unoccupied storage layer may exist in the first storage layers, but the materials do not occupy all of the first storage layers. In this case, the goods taking or placing apparatus places the material on the unoccupied storage layer reached for the first time during the movement, which means that the goods taking or placing apparatus may try to place the material on the first storage layer that can be reached by the goods taking or placing apparatus after moving a small distance, and the storage layer that can be reached by the goods taking or placing apparatus after movement by a large distance is vacated, which can help reduce the movement distance of the goods taking or placing apparatus.

BRIEF DESCRIPTION OF THE DRAWINGS

In order to describe the technical solutions in embodiments of this application or the related art more clearly, the following briefly describes the accompanying drawings required for describing the embodiments or the related art. Apparently, the accompanying drawings in the following description show some embodiments of this application, and those of ordinary skill in the art may still derive other accompanying drawings from the accompanying drawings without creative efforts.

DETAILED DESCRIPTION

In order to make the objectives, technical solutions, and advantages of the embodiments of this application clearer, the technical solutions in the embodiments of this application will be clearly and completely described with reference to the accompanying drawings in the embodiments of this application. Obviously, the described embodiments are parts of the embodiments of this application, but not all of the embodiments. All other embodiments obtained by a person of ordinary skill in the art based on the embodiments of this application without creative efforts shall fall within the protection scope of this application.

This application may be applied to a material carrying scenario. The material may include but is not limited to: goods and a logistics crate. The material is usually stored on a plurality of shelving units in a warehouse. When the material needs to be shipped from the warehouse, the material may be taken from the shelving unit of the warehouse and placed in the conveyor by a robot. The conveyor may convey the material to a workbench so that the workbench can pick the material, and the picked material is the shipped material. The remaining material may be conveyed to the robot by the conveyor, so that the robot can put the material back on the shelving unit of the warehouse.

Embodiments of this application provide a material conveying method and device, so that a goods taking or placing apparatus can place a material on an unoccupied storage layer reached for the first time during movement. Upon completion of placement of the goods on the first storage layers, the robot immediately leaves the conveyor or waits for a period of time before leaving. In this way, an unoccupied storage layer may exist in the first storage layers, but the materials do not occupy all of the first storage layers. In this case, the goods taking or placing apparatus places the material on the unoccupied storage layer reached for the first time during the movement, which means that the goods taking or placing apparatus may try to place the material on the first storage layer that can be reached by the goods taking or placing apparatus after moving a small distance, and the storage layer that can be reached by the goods taking or placing apparatus after movement by a large distance is vacated, which can help reduce the movement distance of the goods taking or placing apparatus.

A material conveying method provided in an embodiment of this application may be applied to an unloading device.

Figure 1:
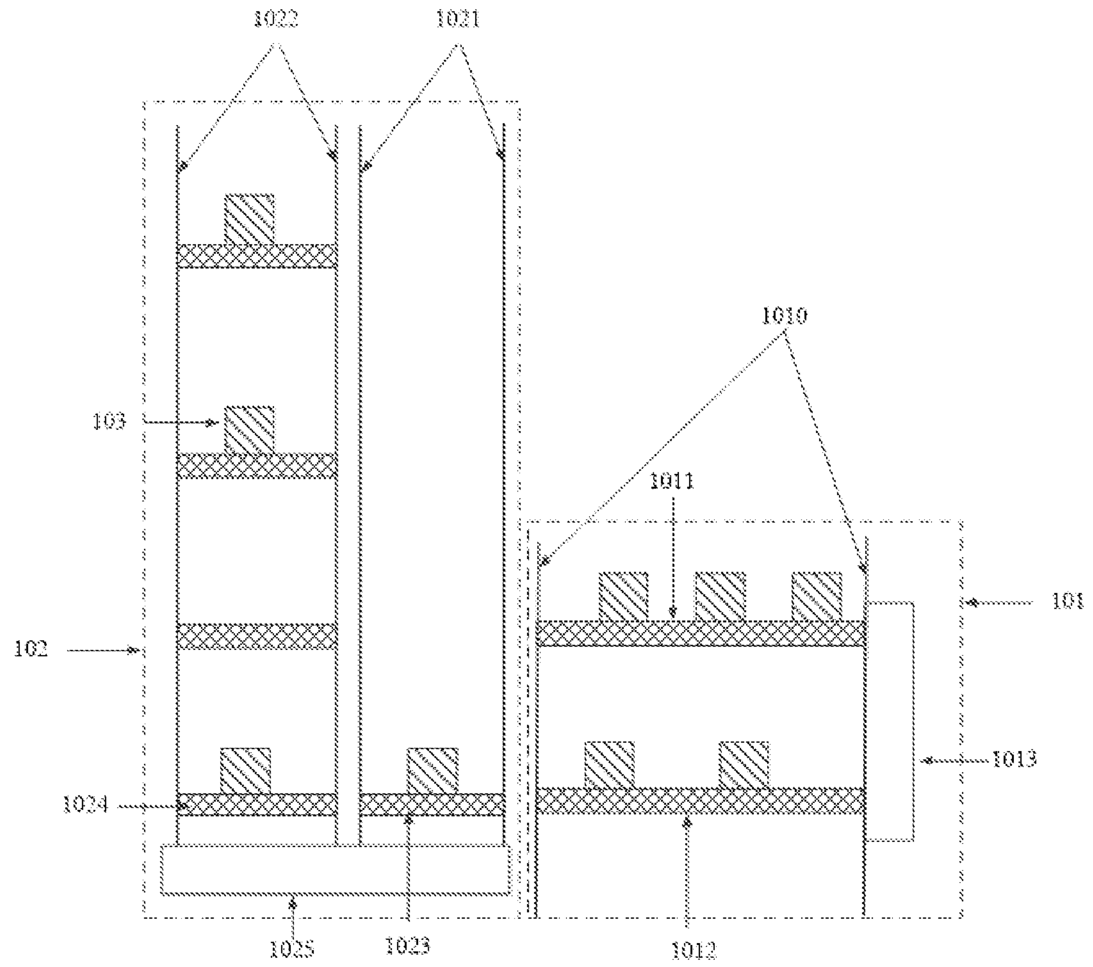
FIG. 1 exemplarily shows a side view of an unloading device according to an embodiment of this application.
Figure 2:
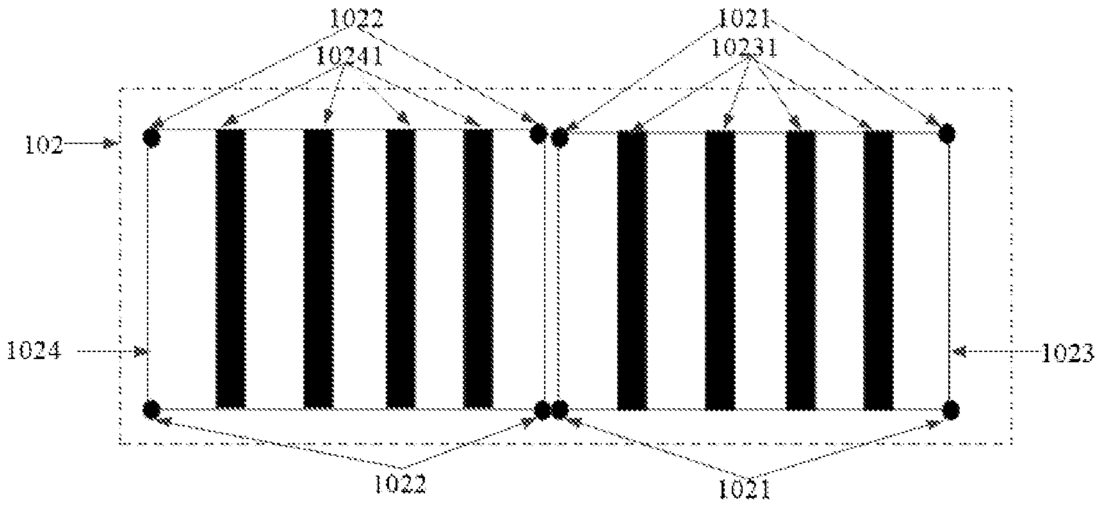
FIG. 2 exemplarily shows a top view of a robot in an unloading device according to an embodiment of this application.
Figure 3:
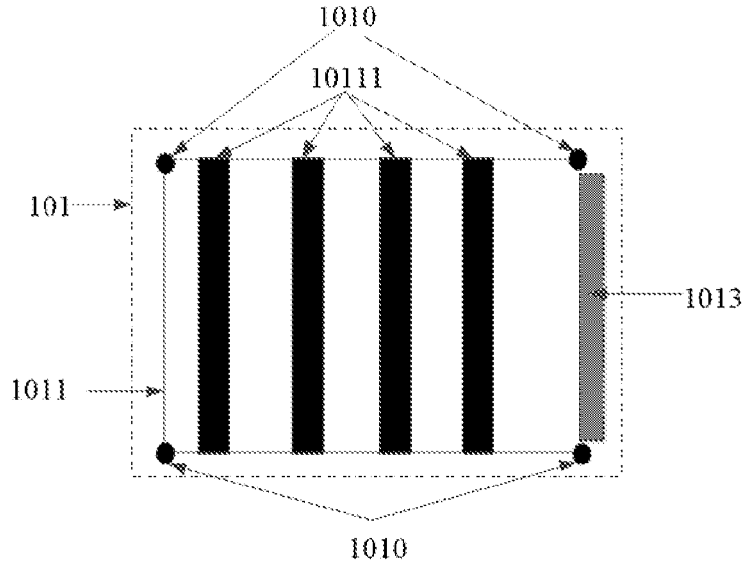
FIG. 3 exemplarily shows a top view of a conveyor in an unloading device according to an embodiment of this application.

FIG. 1 exemplarily shows a side view of an unloading device according to an embodiment of this application. FIG. 2 exemplarily shows a top view of a robot 102 in an unloading device according to an embodiment of this application. FIG. 3 exemplarily shows a top view of a conveyor 101 in an unloading device according to an embodiment of this application. In FIG. 1, for ease of illustration, a set distance is defined between the conveyor 101 and the robot 102. In practical application, when a material 103 is conveyed between the conveyor and the robot, the distance is less than a preset threshold, to prevent the material 103 from falling down between the conveyor and the robot.

As shown in FIG. 1 to FIG. 3, the unloading device includes the conveyor 101 and the robot 102. The conveyor 101 includes a to-be-placed goods conveying layer 1011 and a to-be-taken goods conveying layer 1012 arranged in parallel from up to down. The robot 102 includes at least one goods taking or placing apparatus 1023 and at least two first storage layers 1024.

It may further be seen from FIG. 1 that the robot 102 further has a chassis 1025 configured to move the robot 102.

In addition, FIG. 1 further exemplarily shows a support frame 1022 configured to support the first storage layers 1024, a support frame 1021 configured to support the goods taking or placing apparatus 1023, and a support rod 1010 configured to support the to-be-taken goods conveying layer 1012 and the to-be-placed goods conveying layer 1011. As shown in FIG. 2, the support frame 1021 is located around the goods taking or placing apparatus 1023, and the support frame 1022 is located around the first storage layer 1024. As shown in FIG. 3, the support frame 1010 is located around the to-be-placed goods conveying layer 1011 and the to-be-taken goods conveying layer 1012. In this way, the support frame 1021 may be prevented from affecting the taking and placing of the material 103 on the goods taking or placing apparatus 1023. The support frame 1022 may be prevented from affecting the taking and placing of the material 103 on the first storage layer 1024. The support frame 1010 may be prevented from affecting the taking and placing of the material 103 on the to-be-placed goods conveying layer 1011 and the to-be-taken goods conveying layer 1012. Certainly, positions and a quantity of the support frames 1010, the support frames 1021, and the support frames 1022 may be flexibly set, so as not to affect the taking and placing of the material 103.

The goods taking or placing apparatus 1023 is movable in a first direction of the support frame 1021, and the first direction is perpendicular to the to-be-placed goods conveying layer 1011 and the to-be-taken goods conveying layer 1012. The goods taking or placing apparatus 1023 is configured to place, on the to-be-placed goods conveying layer 1011, the material on the first storage layer 1024, or place, on the first storage layer 1024, the material on the to-be-taken goods conveying layer 1012.

It may be learned that the first direction is a height direction of the robot 102. FIG. 1 exemplarily shows four first storage layers 1024. In practical application, a quantity of first storage layers 1024 may be flexibly changed, which is not limited in this embodiment of this application.

It can be seen from FIG. 2 that a transfer mechanism 10231 may be arranged on the goods taking or placing apparatus 1023, and a transfer mechanism 10241 is arranged on the first storage layer 1024. The transfer mechanism 10231 and the transfer mechanism 10241 are configured to convey the material 103 through rotation.

Figure 4:
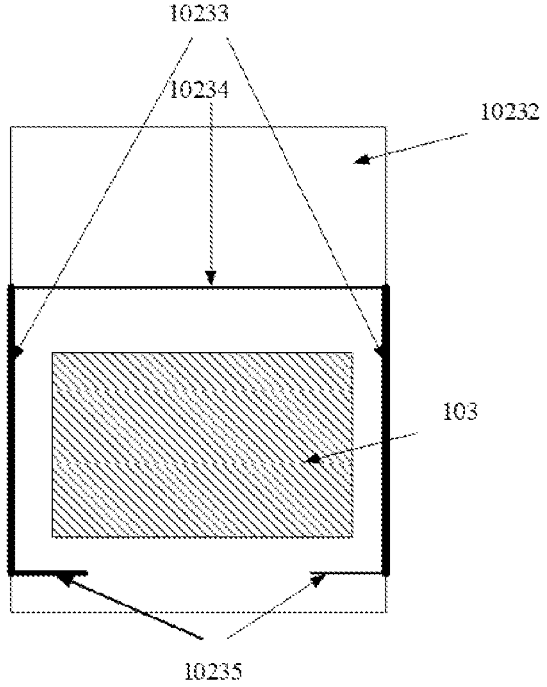
FIG. 4 exemplarily shows a top view of a goods taking or placing apparatus of a robot according to an embodiment of this application.

Certainly, in addition to the structure of the goods taking or placing apparatus 1023 shown in FIG. 2, the goods taking or placing apparatus 1023 may further be shown in FIG. 4. As shown in FIG. 4, the goods taking or placing apparatus 1023 includes a tray 10232, a telescopic arm 10233, a fixed push rod 10234, and a movable push rod 10235. The fixed push rod 10234 and the movable push rod 10235 are both mounted to the telescopic arm 10233.

The tray 10232 is configured for the material 103 to be placed, and the tray 10232 may be a flat plate horizontally arranged.

The telescopic arm 10233 is stretchable or retractable. When the telescopic arm 10233 is stretched, the movable push rod 10235 is retracted to an inner side of the telescopic arm 10233, and the fixed push rod 10234 is stretched accordingly to push the material 103 out of the tray 10232. When the telescopic arm 10233 is retracted, the fixed push rod 10234 is retracted accordingly, the movable push rod 10235 is stretched to be perpendicular to the telescopic arm 10233, and the movable push rod 10235 pulls the material 103 onto the tray 10232.

In practical application, the structure of the goods taking or placing apparatus may be selected according to an actual application scenario, which is not limited in this application. It may further be seen from FIG. 3 that a transfer mechanism 10111 is arranged on the to-be-placed goods conveying layer 1011 and is configured to convey the material 103 through rotation. It may be understood that when the to-be-taken goods conveying layer 1012 is located above the to-be-placed goods conveying layer 1011, a structure of the to-be-taken goods conveying layer 1012 is seen in the top view shown in FIG. 3. The structure of the to-be-taken goods conveying layer 1012 is the same as the structure of the to-be-placed goods conveying layer 1011. The details are not described herein again.

Optionally, the goods taking or placing apparatus 1023, the first storage layer 1024, the to-be-placed goods conveying layer 1011, and the to-be-taken goods conveying layer 1012 convey the material 103 at the same speed.

It may be understood that when the transfer mechanism is arranged on each of the goods taking or placing apparatus 1023, the first storage layer 1024, the to-be-placed goods conveying layer 1011, and the to-be-taken goods conveying layer 1012, these transfer mechanisms rotate at the same speed.

The goods taking or placing apparatus 1023, the first storage layer 1024, the to-be-placed goods conveying layer 1011, and the to-be-taken goods conveying layer 1012 convey the material 103 at the same speed. Therefore, different rotational speeds may be prevented from causing rollover of the material 103 during the conveying of the material 103 respectively by the goods taking or placing apparatus 1023, the first storage layer 1024, the to-be-placed goods conveying layer 1011, and the to-be-taken goods conveying layer 1012.

The conveyor 101 in the above unloading device is configured to convey the received material 103 to a workstation, and the remaining material 103 is conveyed after being picked by the workstation. The material 103 received by the conveyor 101 may be placed by the robot 102 or an unloader, and the conveyor 101 may convey the remaining material 103 to the robot 102 or the unloader.

A first end of the to-be-placed goods conveying layer 1011 of the conveyor 101 is used for the material 103 to be placed, and a first end of the to-be-taken goods conveying layer 1012 is used for the material 103 to be taken. The to-be-placed goods conveying layer 1011 is configured to convey the material 103 from the first end of the to-be-placed goods conveying layer 1011 to a second end of the to-be-placed goods conveying layer 1011. The to-be-taken goods conveying layer 1012 is configured to convey the material 103 from the second end of the to-be-taken goods conveying layer 1012 to the first end of the to-be-taken goods conveying layer 1012.

In addition to the to-be-placed goods conveying layer 1011 and the to-be-taken goods conveying layer 1012, the conveyor 101 further includes a connecting apparatus 1013 configured to convey the material 103 from the second end of the to-be-placed goods conveying layer 1011 to the second end of the to-be-taken goods conveying layer 1012.

Figure 5:
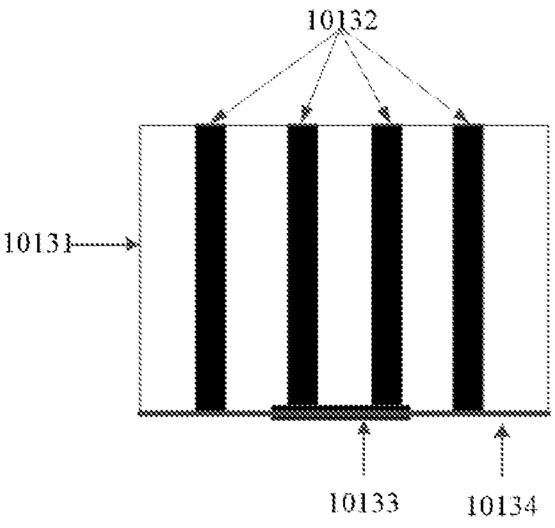
FIG. 5 exemplarily shows a top view of a connecting apparatus in a conveyor according to an embodiment of this application.
Figure 6:
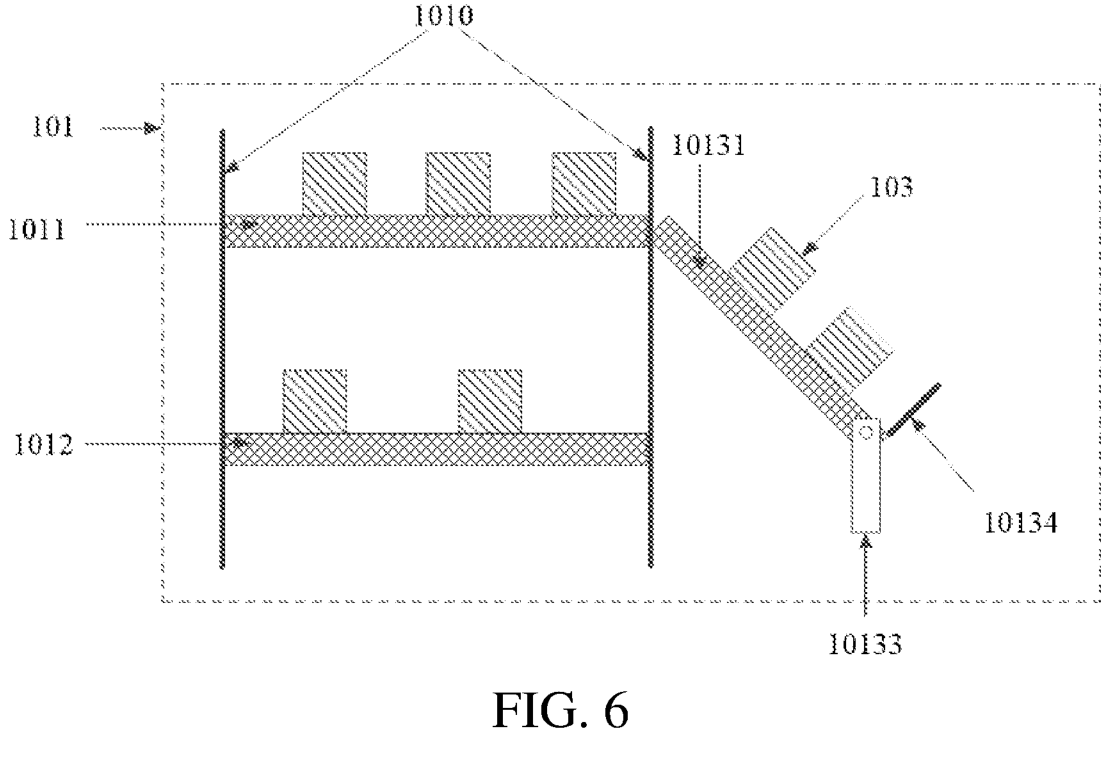
FIG. 6 and FIG. 7 exemplarily show side views of the connecting apparatus in FIG. 5 in two states.
Figure 7:
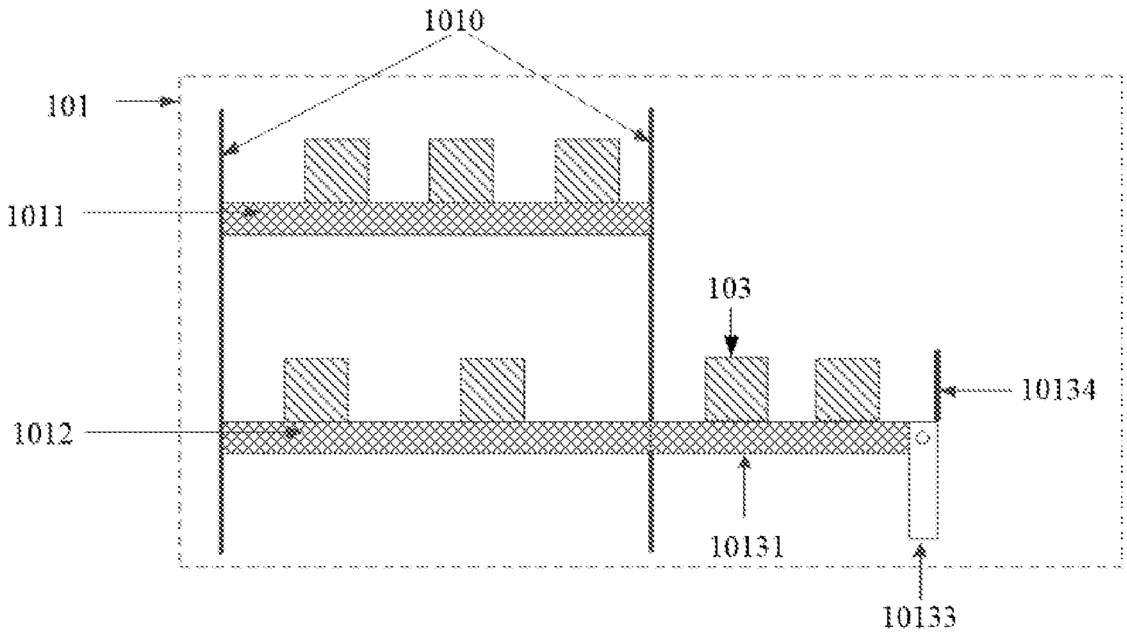

FIG. 5 exemplarily shows a top view of a connecting apparatus 1013 in a conveyor 101 according to an embodiment of this application. FIG. 6 and FIG. 7 exemplarily show side views of the connecting apparatus 1013 corresponding to FIG. 5 in two connection states. As shown in FIG. 5, the connecting apparatus 1013 includes a third storage layer 10131, a transfer mechanism 10132, and a rotary fixing apparatus 10133. A first end of the third storage layer 10131 is rotatably connected to the rotary fixing apparatus 10133, and the third storage layer 10131 is moved between the second end of the to-be-placed goods conveying layer 1011 and the second end of the to-be-taken goods conveying layer 1012. The transfer mechanism 10132 is arranged on the third storage layer 10131 configured to convey the material 103.

As shown in FIG. 6, a second end of the third storage layer 10131 is connected to the second end of the to-be-placed goods conveying layer 1011. As shown in FIG. 7, the second end of the third storage layer 10131 is connected to the second end of the to-be-taken goods conveying layer 1012.

In FIG. 5, the material 103 may be placed on the transfer mechanism 10132 to convey the material 103 through rotation of the transfer mechanism 10132. A rotation direction of the transfer mechanism 10132 can be changed.

The rotary fixing apparatus 10133 may be configured to fix the first end of the third storage layer 10131 so that the first end cannot be moved, and the third storage layer 10131 may be rotated around the rotary fixing apparatus 10133 and perpendicular to a direction of the third storage layer 10131. During the rotation of the third storage layer 10131, the second end of the third storage layer 10131 moves accordingly to be switched between the second end of the to-be-taken goods conveying layer 1012 and the second end of the to-be-placed goods conveying layer 1011. That is to say, the second end of the third storage layer 10131 may be docked with the second end of the to-be-taken goods conveying layer 1012, may be connected to the second end of the to-be-placed goods conveying layer 1011 instead, or may be connected to the second end of the to-be-taken goods conveying layer 1012 instead.

As shown in FIG. 5, FIG. 6, and FIG. 7, in order to prevent the material 103 on the third storage layer 10131 from slipping, a baffle 10134 may further be arranged at the first end of the third storage layer 10131.

In order to realize the movement of the third storage layer 10131 between the second end of the to-be-placed goods conveying layer 1011 and the second end of the to-be-taken goods conveying layer 1012, three manners may be adopted.

In a first manner, the third storage layer 10131 moves between the second end of the to-be-placed goods conveying layer 1011 and the second end of the to-be-taken goods conveying layer 1012 through the elastic force thereof and gravity of the material 103 on the third storage layer.

When no material 103 exists on the third storage layer 10131 due to the elastic force thereof, the second end of the third storage layer 10131 is connected to the second end of the to-be-placed goods conveying layer 1011. After the material 103 on the to-be-placed goods conveying layer 1011 is conveyed to the third storage layer 10131, the gravity of the material 103 causes the second end of the third storage layer 10131 to descend to be connected to the second end of the to-be-taken goods conveying layer 1012. After the material 103 on the third storage layer 10131 is conveyed to the to-be-taken goods conveying layer 1012, the second end of the third storage layer 10131 moves back to the second end of the to-be-placed goods conveying layer 1011. Such a cycle is repeated.

According to this embodiment of this application, the second end of the third storage layer 10131 can be moved through the elastic force thereof and the gravity of the material 103 without using other control structures or components, which can help simplify the structure of the third storage layer 10131.

In a second manner, in addition to the third storage layer 10131, the transfer mechanism 10132, and the rotary fixing apparatus 10133, the connecting apparatus 1013 further includes a second controller and a material quantity detection apparatus. The material quantity detection apparatus is configured to detect a material quantity on the third storage layer 10131. The second controller is configured to: control the second end of the third storage layer 10131 to be connected to the second end of the to-be-taken goods conveying layer 1012 when the material quantity on the third storage layer 10131 is greater than or equal to a preset material quantity threshold, or control the second end of the third storage layer 10131 to be connected to the second end of the to-be-placed goods conveying layer 1011 when the material quantity on the third storage layer 10131 is less than the preset material quantity threshold.

The material quantity may be a weight of the material 103 or a quantity of materials 103. Accordingly, the material quantity detection apparatus may be a pressure sensor or an image acquisition apparatus.

The pressure sensor may be arranged at a bottom of the third storage layer 10131 to detect a pressure that the material 103 on the third storage layer 10131 applies to the third storage layer 10131. The pressure is the weight of the material 103.

The image acquisition apparatus faces the third storage layer 10131 to collect an image of the material 103 on the third storage layer 10131, and identify the quantity of materials 103 from the image of the material 103.

The material quantity detection apparatus is electrically connected to the second controller to send the material quantity to the second controller. The second controller may control the movement of the third storage layer 10131 according to the material quantity. In addition, when the material quantity detection apparatus is the image acquisition apparatus, the image acquisition apparatus may further send the image of the material 103 to the second controller, so that the second controller can identify the quantity of materials 103 and control the movement of the third storage layer 10131.

In a third manner, in addition to the third storage layer 10131, the transfer mechanism 10132, and the rotary fixing apparatus 10133, the connecting apparatus 1013 further includes a second controller configured to control the second end of the third storage layer 10131 to be alternately connected to the second end of the to-be-taken goods conveying layer 1012 and the second end of the to-be-placed goods conveying layer 1011 respectively at a preset time period.

The preset time period may be determined according to conveying speeds of the to-be-taken goods conveying layer 1012 and the to-be-placed goods conveying layer 1011. When the conveying speed is relatively large, the preset time period may be set to a relatively small value. When the conveying speed is relatively small, the preset time period may be set to a relatively large value.

Further, the preset time period may be further determined according to the conveying speed and a length of the third storage layer 10131. When the conveying speed is constant, the preset time period may be set to a relatively large value if the length of the third storage layer 10131 is relatively large, and the preset time period may be set to a relatively small value if the length of the third storage layer 10131 is relatively small.

In practical application, a functional relationship among the preset time period, the conveying speed, and the length of the third storage layer 10131 may be constructed based on experience. For example, the functional relationship may be a linear function, which may be a linear function of a ratio of the length of the third storage layer 10131 to the conveying speed.

After the preset time period is determined according to the above method, the second end of the third storage layer 10131 may be caused to be alternately connected to the second end of the to-be-taken goods conveying layer 1012 and the second end of the to-be-placed goods conveying layer 1011 respectively according to the preset time period. For example, when the preset time period is 1 minute, the second end of the third storage layer 10131 may be caused to be connected to the second end of the to-be-taken goods conveying layer 1012 within a first minute, the second end of the third storage layer 10131 may be caused to be connected to the second end of the to-be-placed goods conveying layer 1011 within a second minute, and the second end of the third storage layer 10131 may be caused to be connected to the second end of the to-be-taken goods conveying layer 1012 within a third minute. Such a cycle is repeated.

It should be noted that, in the above three manners, when the second end of the third storage layer 10131 is connected to the second end of the to-be-placed goods conveying layer 1011, a conveying direction of the third storage layer 10131 faces away from the to-be-placed goods conveying layer 1011, so that the material 103 is conveyed to the third storage layer 10131 from the to-be-placed goods conveying layer 1011. When the second end of the third storage layer 10131 is connected to the second end of the to-be-taken goods conveying layer 1012, the conveying direction of the third storage layer 10131 faces the to-be-taken goods conveying layer 1012, so that the material 103 is conveyed to the to-be-taken goods conveying layer 1012 from the third storage layer 10131. Therefore, after the second end of the third storage layer 10131 is switched between the second end of the to-be-placed goods conveying layer 1011 and the second end of the to-be-taken goods conveying layer 1012, the rotation direction of the transfer mechanism 10132 needs to be switched, and the rotation directions before and after the switching are opposite.

In order to move the second end of the third storage layer 10131, the second controller may be electrically connected to the rotary fixing apparatus 10133, so that the rotary fixing apparatus 10133 rotates the third storage layer 10131. The rotation direction and angle are preset.

Figure 8:
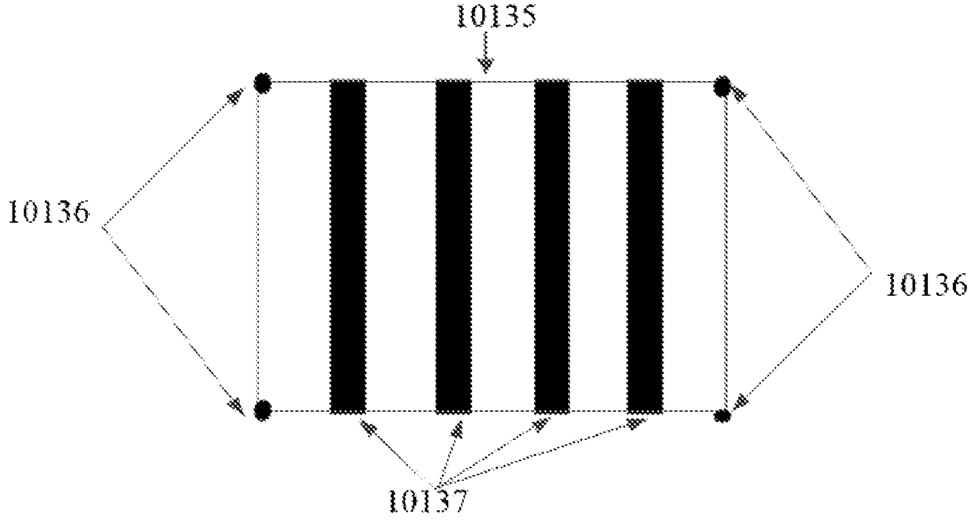
FIG. 8 exemplarily shows a top view of another connecting apparatus in a conveyor according to an embodiment of this application.
Figure 9:
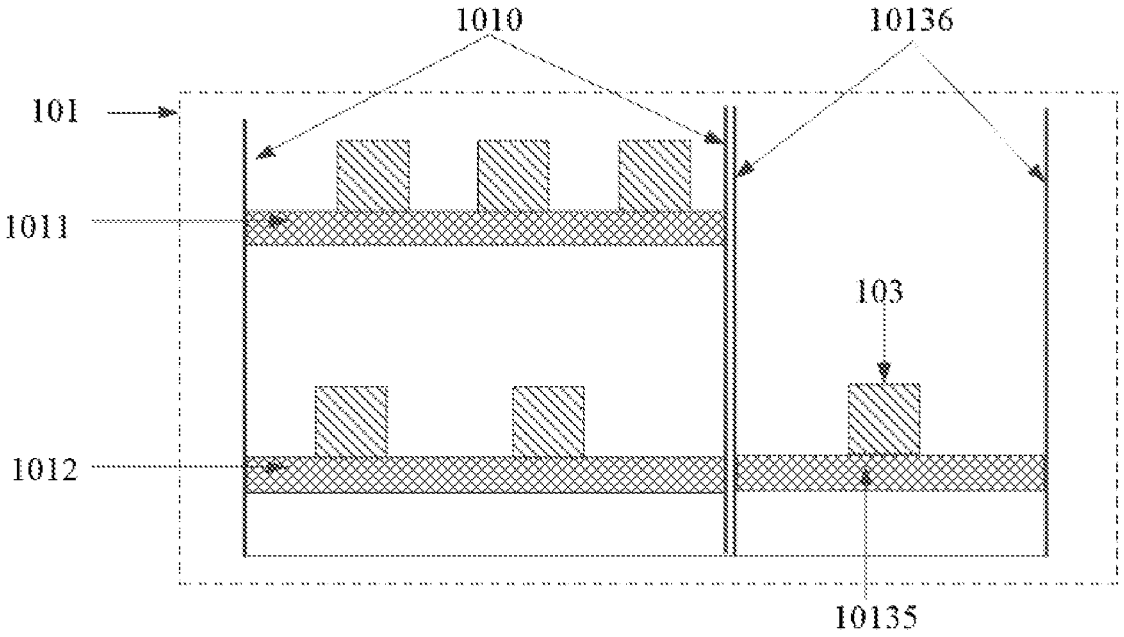
FIG. 9 and FIG. 10 exemplarily show side views of the connecting apparatus in FIG. 8 in two states.
Figure 10:
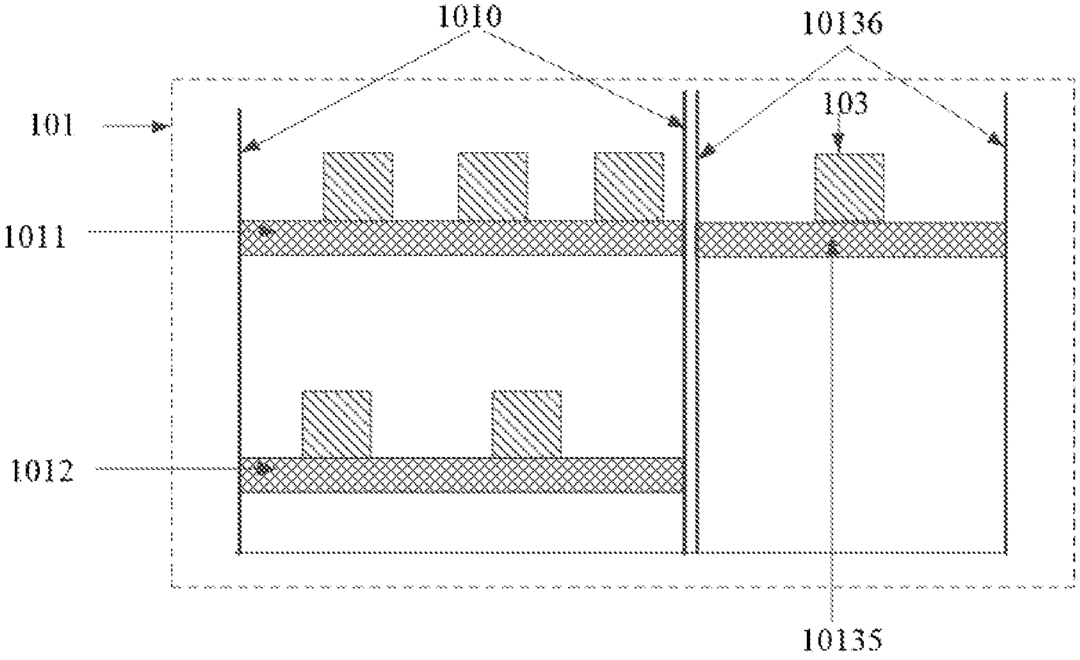

FIG. 8 exemplarily shows a top view of another connecting apparatus 1013 in a conveyor 101 according to an embodiment of this application. FIG. 9 and FIG. 10 exemplarily show side views of the connecting apparatus 1013 corresponding to FIG. 8 in two states. The connecting apparatus 1013 in FIG. 8 to FIG. 10 is an elevator.

It can be seen from FIG. 8 that the elevator includes four support frames 10136 and a fourth storage layer 10135 arranged on the support frame 10136. A transfer mechanism 10137 is arranged on the fourth storage layer 10135, and the transfer mechanism 10137 may convey the material 103 through rotation.

As shown in FIG. 9 or FIG. 10, the fourth storage layer 10135 can slide from up to down along the support frame 10136. The fourth storage layer may be docked with the second end of the to-be-placed goods conveying layer 1011 or the second end of the to-be-taken goods conveying layer 1012 during the sliding from up to down. In FIG. 9, the second end of the fourth storage layer 10135 is docked with the second end of the to-be-taken goods conveying layer 1012. In FIG. 10, the second end of the fourth storage layer 10135 is docked with the second end of the to-be-placed goods conveying layer 1011. In this way, the material 103 is obtained from the second end of the to-be-placed goods conveying layer 1011 during the second end of the fourth storage layer docking with the second end of the to-be-placed goods conveying layer 1011. Then, the elevator slides down to be docked with the second end of the to-be-taken goods conveying layer 1012, so as to place the material 103 on the second end of the to-be-taken goods conveying layer 1012. Then the elevator slides upward again to be docked with the second end of the to-be-placed goods conveying layer 1011, to obtain the material 103 from the second end of the to-be-placed goods conveying layer 1011 again. Such a cycle is repeated.

It may be understood that when the second end of the fourth storage layer 10135 is docked with the second end of the to-be-placed goods conveying layer 1011, the rotation direction of the transfer mechanism 10137 on the fourth storage layer 10135 faces away from the to-be-placed goods conveying layer 1011. When the second end of the fourth storage layer 10135 is docked with the second end of the to-be-taken goods conveying layer 1012, the rotation direction of the transfer mechanism 10137 on the fourth storage layer 10135 faces the to-be-taken goods conveying layer 1012.

It should be noted that, the to-be-placed goods conveying layer 1011 shown in FIG. 9 or FIG. 10 is located above the to-be-taken goods conveying layer 1012. In practical application, the to-be-placed goods conveying layer 1011 may be further located below the to-be-taken goods conveying layer 1012.

The material conveying method and device of the embodiments of this application are described in detail below.

Figure 11:
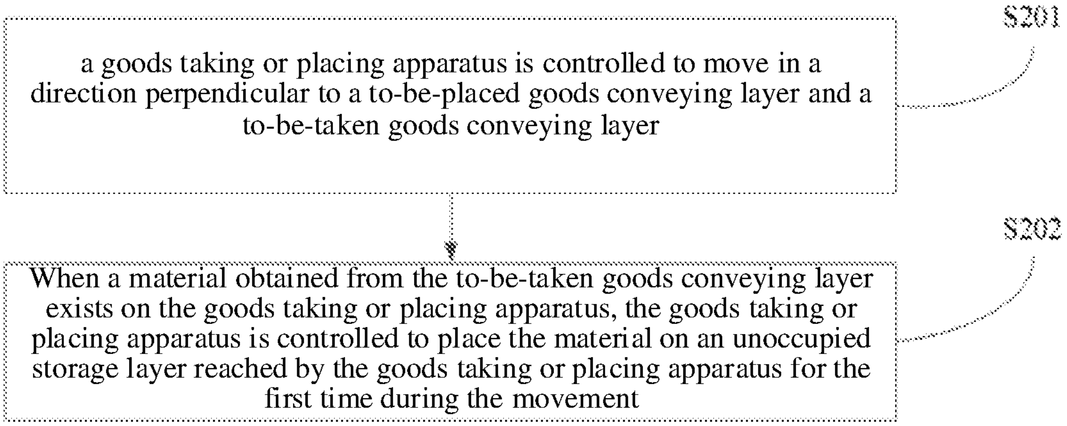
FIG. 11 exemplarily shows a flowchart of steps of a material conveying method according to an embodiment of this application.

FIG. 11 exemplarily shows a flowchart of steps of a material conveying method according to an embodiment of this application. As shown in FIG. 11, the method includes the following steps.

S201: a goods taking or placing apparatus is controlled to move in a direction perpendicular to a to-be-placed goods conveying layer and a to-be-taken goods conveying layer.

The vertical direction includes a direction from the to-be-placed goods conveying layer to the to-be-taken goods conveying layer and a direction from the to-be-taken goods conveying layer to the to-be-placed goods conveying layer. The goods taking or placing apparatus moves along a support rod where the goods taking or placing apparatus is located, and the support rod is perpendicular to the to-be-taken goods conveying layer and the to-be-placed goods conveying layer. It may be learned that the vertical direction is the first direction as described above, and the vertical direction includes a first vertical direction and a second vertical direction. Since the to-be-taken goods conveying layer and the to-be-placed goods conveying layer are arranged in parallel from up to down, the first vertical direction and the second vertical direction are respectively upward and downward.

Optionally, the goods taking or placing apparatus may be controlled to alternately move in the first vertical direction and the second vertical direction. The movement in the first vertical direction includes moving from a start storage layer to an end storage layer, and the movement in the second vertical direction includes moving from the end storage layer to the start storage layer. In an initial state, the start storage layer is an uppermost layer of the at least two first storage layers, and the end storage layer is a lowermost layer of the at least two first storage layers. The start storage layer and the end storage layer are respectively updated to an uppermost layer and a lowermost layer of a to-be-taken material storage layer after the material is placed on one of the first storage layers. A to-be-taken material exists on the to-be-taken material storage layer.

It may be understood that after the material is placed on the first storage layer, the material cannot be placed on or taken from the first storage layer, thereby controlling the goods taking or placing apparatus no longer to move to the first storage layer. In this embodiment of this application, the material is generally placed on the successive first storage layers, so that the start storage layer and the end storage layer can be updated every time the material is placed on one of the first storage layers. The start storage layer and the end storage layer are respectively the uppermost layer and the lowermost layer of the first storage layers where the material can be taken from and placed on.

The goods taking or placing apparatus may move up and down. For example, the goods taking or placing apparatus may cyclically move as follows: move up a distance—move down a distance— . . . —move up a distance.

S202: When a material obtained from the to-be-taken goods conveying layer exists on the goods taking or placing apparatus, the goods taking or placing apparatus is controlled to place the material on an unoccupied storage layer reached by the goods taking or placing apparatus for the first time during the movement.

The unoccupied storage layer is the first storage layer in an unoccupied state. The unoccupied storage layer may be the first storage layer on which no material is ever placed, and may be further the first storage layer from which the material is taken.

Optionally, when no material exists on the goods taking or placing apparatus, at least one unoccupied storage layer exists in the at least two first storage layers, and a material exists on the to-be-taken goods conveying layer, the goods taking or placing apparatus is controlled to take the material from the to-be-taken goods conveying layer.

In practical application, the to-be-placed goods conveying layer may convey the material to a workstation, the workstation is configured to sort the material, and the sorted material continues to be conveyed by the to-be-taken goods conveying layer. If the material in the to-be-taken goods conveying layer cannot be taken away in time, the material on the to-be-taken goods conveying layer may be accumulated. As a result, the sorted material cannot be conveyed to the to-be-taken goods conveying layer, which affects the material sorting progress.

In this embodiment of this application, when the material exists on the to-be-taken goods conveying layer, priority may be given to taking goods from the to-be-taken goods conveying layer as long as no material exists on the goods taking or placing apparatus and an unoccupied storage layer exists in the first storage layers. In this way, the material may be prevented from being accumulated on the to-be-taken goods conveying layer, thereby avoiding the impact on the material sorting progress.

Further, when no material exists on the goods taking or placing apparatus and at least one unoccupied storage layer exists in the at least two first storage layers, a quantity of materials on the to-be-taken goods conveying layer may be detected. If the material quantity exceeds a preset material quantity threshold, the goods taking or placing apparatus may be controlled to take the material from the to-be-taken goods conveying layer. If the material quantity does not exceed the preset material quantity threshold, the goods taking or placing apparatus may be controlled to take a material from the to-be-taken goods conveying layer or take a material from the first storage layer.

Optionally, when no material exists on the goods taking or placing apparatus, the goods taking or placing apparatus is controlled to take the material from a target material layer reached for the first time during the movement. The target material layer is the first storage layer or the to-be-taken goods conveying layer.

When no material exists on the goods taking or placing apparatus, the goods taking or placing apparatus may be configured to take the material. Specifically, the material may be taken from the first storage layer and placed on the to-be-placed goods conveying layer, or the material may be taken from the to-be-taken goods conveying layer and placed on the first storage layer. In this embodiment of this application, in order to further shorten the movement distance of the goods taking or placing apparatus, the goods taking or placing apparatus may be controlled to take the material from the target material layer reached for the first time during the movement.

Optionally, when no material exists on the goods taking or placing apparatus and no unoccupied storage layer exists in the at least two first storage layers, the goods taking or placing apparatus is controlled to take the material from the first storage layer reached for the first time during the movement.

It may be understood that when no unoccupied storage layer exists in the first storage layers, if the goods taking or placing apparatus takes the material from the to-be-taken goods conveying layer, the taken material cannot be placed on the first storage layer. Therefore, according to this embodiment of this application, in this scenario, the goods taking or placing apparatus is controlled to take the material from the first storage layer first. After the material is taken, it is determined whether a goods placing location of the to-be-placed goods conveying layer is unoccupied. If the goods placing location is unoccupied, the taken material is placed on the to-be-placed goods conveying layer. If the material exists on the goods placing location of the to-be-placed goods conveying layer, the determination is performed at regular intervals until the taken material is placed on the to-be-placed goods conveying layer.

Optionally, when a material obtained from the first storage layer exists on the goods taking or placing apparatus, the goods taking or placing apparatus is controlled to place the material on the to-be-placed goods conveying layer.

Optionally, the storage layer reached by the goods taking or placing apparatus for the first time during the movement is a to-be-taken material storage layer, and a to-be-taken material exists on the to-be-taken material storage layer.

It should be noted that, the to-be-taken material is the material that needs to be placed on the to-be-placed goods conveying layer, which needs to be distinguished from the material taken from the to-be-taken goods conveying layer. After the material taken from the to-be-taken goods conveying layer is placed on the first storage layer, the material cannot be taken out from the first storage layer.

Optionally, a temporary shelving unit is further arranged beside the conveyor, at least one second storage layer is arranged on the temporary shelving unit, and the second storage layer is configured for the material taken from the to-be-taken goods conveying layer to be placed.

The robot may place, on one of the second storage layers of the temporary shelving unit, the material taken from the to-be-taken goods conveying layer of the conveyor through the goods taking or placing apparatus, and may further place, on the first storage layer, the material on the second storage layer through the goods taking or placing apparatus. When a transfer mechanism is arranged on the goods taking or placing apparatus, a transfer mechanism may also be arranged on the second storage layer to convey the material. When the goods taking or placing apparatus may push the material onto the second storage layer or pull up the material from the second storage layer, the transfer mechanism may not be arranged on the second storage layer.

It may be understood that when the material is accumulated on the to-be-taken goods conveying layer, the sorted material cannot be conveyed to the to-be-taken goods conveying layer. In this case, the sorting of the material needs to be suspended. According to this embodiment of this application, the material on the to-be-taken goods conveying layer may be placed on the temporary shelving unit, which can help avoid the accumulation of the material on the to-be-taken goods conveying layer, and further avoid the impact on the material sorting.

Optionally, when a material exists on the to-be-taken goods conveying layer, no unoccupied storage layer exists in the at least two first storage layers, and an unoccupied storage layer exists in the second storage layers, the goods taking or placing apparatus is controlled to take the material from the to-be-taken goods conveying layer and place the material on the unoccupied storage layer in the second storage layers.

It may be understood that when no unoccupied storage layer exists in the at least two first storage layers, the goods taking or placing apparatus cannot place, on the first storage layer, the material on the to-be-taken goods conveying layer. In this case, when an unoccupied storage layer exists in the second storage layers, the robot may first take the material from the to-be-taken goods conveying layer and place the material on the unoccupied storage layer in the second storage layers. Then the robot may place, on the to-be-placed goods conveying layer, the material on the first storage layer, and after an unoccupied storage layer exists in the first storage layers, the material is taken from the to-be-taken goods conveying layer and placed on the unoccupied storage layer in the first storage layers.

Further, when no unoccupied storage layer exists in the at least two first storage layers, the material on the to-be-taken goods conveying layer may be detected. If the material on the to-be-taken goods conveying layer exceeds the preset material quantity threshold and an unoccupied storage layer exists in the second storage layers, the goods taking or placing apparatus is controlled to take the material from the to-be-taken goods conveying layer and place the material on the unoccupied storage layer in the second storage layers. If the material on the to-be-taken goods conveying layer does not exceed the preset material quantity threshold, the goods taking or placing apparatus may be controlled to take the material from the to-be-taken goods conveying layer and place the material on the unoccupied storage layer in the second storage layers, or take the material from the first storage layer and place the material on the to-be-placed goods conveying layer.

Optionally, when no material exists on the to-be-taken goods conveying layer, an unoccupied storage layer exists in the at least two first storage layers, and a material exists on the at least one second storage layer, the goods taking or placing apparatus is controlled to take the material from the second storage layer and place the material on the unoccupied storage layer in the first storage layers.

When a material exists on the to-be-taken goods conveying layer and an unoccupied storage layer exists in the at least two first storage layers, the goods taking or placing apparatus is controlled to take the material from the to-be-taken goods conveying layer and place the material on the unoccupied storage layer in the first storage layers.

According to this embodiment of this application, the material may be taken from the to-be-taken goods conveying layer in advance. If no material exists on the to-be-taken goods conveying layer, the material is to be taken from a temporary storage layer. In this way, the accumulation of materials on the to-be-taken goods conveying layer can be avoided, thereby avoiding the impact on the material sorting.

Optionally, when the quantity of materials on the second storage layer exceeds the preset material quantity threshold, a plurality of robots may be controlled to take materials from the second storage layer. A preset quantity of unoccupied storage layers exists in the first storage layers of the robot. Ideally, all of the first storage layers of the robot are unoccupied storage layers.

An embodiment of this application further provides an unloading device, including: a robot, a conveyor, and a controller, where the robot includes at least one goods taking or placing apparatus and at least two first storage layers, and the conveyor includes a to-be-placed goods conveying layer and a to-be-taken goods conveying layer arranged in parallel from up to down. The controller is configured to: control the goods taking or placing apparatus to move in a direction perpendicular to the to-be-placed goods conveying layer and the to-be-taken goods conveying layer, and control, when a material obtained from the to-be-taken goods conveying layer exists on the goods taking or placing apparatus, the goods taking or placing apparatus to place the material on an unoccupied storage layer reached by the goods taking or placing apparatus for the first time during the movement.

Optionally, the controller is further configured to:

control, when no material exists on the goods taking or placing apparatus, at least one unoccupied storage layer exists in the at least two first storage layers, and a material exists on the to-be-taken goods conveying layer, the goods taking or placing apparatus to take the material from the to-be-taken goods conveying layer.

Optionally, the controller is further configured to:

control the goods taking or placing apparatus to take a material from a target material layer reached for the first time during the movement when no material exists on the goods taking or placing apparatus, where the target material layer is the first storage layer or the to-be-taken goods conveying layer.

Optionally, when the target material layer is the first storage layer, the controller is further configured to:

control the goods taking or placing apparatus to take a material from the first storage layer reached for the first time during the movement when no material exists on the goods taking or placing apparatus and no unoccupied storage layer exists in the at least two first storage layers.

Optionally, the controller is further configured to:

control, when a material obtained from the first storage layer exists on the goods taking or placing apparatus, the goods taking or placing apparatus to place the material on the to-be-placed goods conveying layer.

Optionally, the storage layer reached by the goods taking or placing apparatus for the first time during the movement is a to-be-taken material storage layer, and a to-be-taken material exists on the to-be-taken material storage layer.

Optionally, the controller is further configured to:

control the goods taking or placing apparatus to alternately move in a first vertical direction and a second vertical direction, where the movement in the first vertical direction includes: moving from a start storage layer to an end storage layer, and the movement in the second vertical direction includes: moving from the end storage layer to the start storage layer, where in an initial state, the start storage layer and the end storage layer are respectively an uppermost layer and a lowermost layer of the at least two first storage layers; and respectively update the start storage layer and the end storage layer to an uppermost layer and a lowermost layer of a to-be-taken material storage layer after the material is placed on one of the first storage layers, where a to-be-taken material exists on the to-be-taken material storage layer.

Optionally, a temporary shelving unit is further arranged beside the conveyor, at least one second storage layer is arranged on the temporary shelving unit, and the second storage layer is configured for the material taken from the to-be-taken goods conveying layer to be placed.

Optionally, the controller is further configured to:

control, when a material exists on the to-be-taken goods conveying layer, no unoccupied storage layer exists in the at least two first storage layers, and an unoccupied storage layer exists in the second storage layers, the goods taking or placing apparatus to take the material from the to-be-taken goods conveying layer and place the material on the unoccupied storage layer in the second storage layers.

Optionally, the controller is further configured to:

control, when no material exists on the to-be-taken goods conveying layer, an unoccupied storage layer exists in the at least two first storage layers, and a material exists on the at least one second storage layer, the goods taking or placing apparatus to take the material from the second storage layer and place the material on the unoccupied storage layer in the first storage layers.

Optionally, the controller is further configured to:

control, when a material exists on the to-be-taken goods conveying layer and an unoccupied storage layer exists in the at least two first storage layers, the goods taking or placing apparatus to take the material from the to-be-taken goods conveying layer and place the material on the unoccupied storage layer in the first storage layers.

The unloading device provided in embodiment of this application is the apparatus embodiment corresponding to the method embodiment, and has the same technical effect as the method embodiment. For detailed description, reference may be made to the method embodiment, and the details are not described herein again.

An embodiment of this application further provides a computer-readable storage medium. The computer-readable storage medium stores computer-executable instructions therein, the computer-executable instructions, when executed by a processor, causing a computing device to implement the material conveying method.

An embodiment of this application further provides a computer program. The computer program is used for implementing the material conveying method.

Finally, it should be noted that, the foregoing embodiments are merely used for describing the technical solutions of this application, but not to limit this application. Although this application is described in detail with reference to the foregoing embodiments, a person of ordinary skill in the art should understand that, the technical solutions specified in the above embodiments can still be modified, or some or all of the technical features therein can be equivalently substituted, and these modifications or replacements do not cause the essence of corresponding technical solutions to depart from the scope of the technical solutions in the embodiments of this application.

What is claimed is:

1. A material conveying method, applicable to an unloading device, wherein the unloading device comprises a robot and a conveyor, the robot comprises at least one goods taking or placing apparatus and at least two first storage layers, and the conveyor comprises a to-be-placed goods conveying layer and a to-be-taken goods conveying layer arranged in parallel from up to down, the robot is configured to take materials from a shelving unit in a warehouse and place the materials to the to-be-placed goods conveying layer, the to-be-placed goods conveying layer is configured to convey the materials from the robot to a workstation for sorting, and after the workstation completes sorting, the to-be-taken goods conveying layer is configured to convey a remained material from the workstation to the robot, the robot is further configured to take the remained material from the to-be-taken goods conveying layer and place on the at least two storage layers; and the method comprises:

controlling the at least one goods taking or placing apparatus to move in a direction perpendicular to the to-be-placed goods conveying layer and the to-be-taken goods conveying layer; and controlling, when the remained material obtained from the to-be-taken goods conveying layer exists on a goods taking or placing apparatus, the goods taking or placing apparatus to place the remained material on an unoccupied storage layer which is nearest to a location of the goods taking or placing apparatus;

wherein the material conveying method further comprises:

when no material exists on the at least one goods taking or placing apparatus, and at least one unoccupied storage layer exists in the at least two first storage layers, detecting a quantity of materials on the to-be-taken goods conveying layer;

when the material quantity exceeds a preset material quantity threshold, controlling the goods taking or placing apparatus to take the material from the to-be-taken goods conveying layer; and when the material quantity does not exceed the preset material quantity threshold, controlling the goods taking or placing apparatus to take the material from the to-be-taken goods conveying layer or take a material from one of the at least two first storage layers.

2. The method according to claim 1, further comprising:

when no material exists on the at least one goods taking or placing apparatus, at least one unoccupied storage layer exists in the at least two first storage layers, and the remained material exists on the to-be-taken goods conveying layer, controlling a goods taking or placing apparatus to take the remained material from the to-be-taken goods conveying layer.

3. The method according to claim 1, further comprising:

controlling a goods taking or placing apparatus to take a material from a target material layer which is nearest to the location of the goods taking or placing apparatus when no material exists on the goods taking or placing apparatus, wherein the target material layer is the first storage layer or the to-be-taken goods conveying layer.

4. The method according to claim 3, wherein the controlling a goods taking or placing apparatus to take a material from a target material layer which is nearest to the location of the goods taking or placing apparatus when no material exists on the goods taking or placing apparatus comprises:

controlling the goods taking or placing apparatus to take a material from one of the at least two first storage layers which is nearest to the location of the goods taking or placing apparatus when no material exists on the goods taking or placing apparatus and no unoccupied storage layer exists in the at least two first storage layers.

5. The method according to claim 3, wherein the target material layer which is nearest to the location of the goods taking or placing apparatus is a to-be-taken material storage layer, and a to-be-taken material exists on the to-be-taken material storage layer.

6. The method according to claim 1, further comprising: controlling, when a material obtained from the first storage layer exists on a goods taking or placing apparatus, the goods taking or placing apparatus to place the material on the to-be-placed goods conveying layer.

7. The method according to claim 1, wherein the controlling the at least one goods taking or placing apparatus to move in a direction perpendicular to the to-be-placed goods conveying layer and the to-be-taken goods conveying layer comprises:

controlling the at least one goods taking or placing apparatus to alternately move in a first vertical direction and a second vertical direction, wherein the movement in the first vertical direction comprises moving from a start storage layer to an end storage layer, and the movement in the second vertical direction comprises moving from the end storage layer to the start storage layer, wherein in an initial state, the start storage layer is an uppermost layer of the at least two first storage layers, and the end storage layer is a lowermost layer of the at least two first storage layers; and respectively updating the start storage layer and the end storage layer to an uppermost layer and a lowermost layer of a to-be-taken material storage layer after the material is placed on one of the at least two first storage layers, wherein a to-be-taken material exists on the to-be-taken material storage layer.

8. The method according to claim 1, wherein a temporary shelving unit is further arranged beside the conveyor, at least one second storage layer is arranged on the temporary shelving unit, and the at least one second storage layer is configured to receive the remained material taken from the to-be-taken goods conveying layer.

9. The method according to claim 8, further comprising: when a material exists on the to-be-taken goods conveying layer, no unoccupied storage layer exists in the at least two first storage layers, and an unoccupied storage layer exists in the second storage layers, controlling a goods taking or placing apparatus to take the material from the to-be-taken goods conveying layer and place the material on the unoccupied storage layer in the at least one second storage layers.

10. The method according to claim 8, further comprising: when no material exists on the to-be-taken goods conveying layer, an unoccupied storage layer exists in the at least two first storage layers, and a material exists on the at least one second storage layer, controlling a goods taking or placing apparatus to take the material from the at least one second storage layer and place the material on the unoccupied storage layer in the at least two first storage layers.

11. The method according to claim 8, further comprising: when a material exists on the to-be-taken goods conveying layer and an unoccupied storage layer exists in the at least two first storage layers, controlling a goods taking or placing apparatus to take the material from the to-be-taken goods conveying layer and place the material on the unoccupied storage layer in the at least two first storage layers.

12. The method according to claim 8, further comprising: when no unoccupied storage layer exists in the at least two first storage layers, detecting the material on the to-be-taken goods conveying layer;

when the material on the to-be-taken goods conveying layer exceeds a preset material quantity threshold and an unoccupied storage layer exists in the at least one second storage layer, controlling the goods taking or placing apparatus to take the material from the to-be-taken goods conveying layer and place the material on the unoccupied storage layer in the at least one second storage layer; and when the material on the to-be-taken goods conveying layer does not exceed the preset material quantity threshold, controlling the goods taking or placing apparatus to take the material from the to-be-taken goods conveying layer and place the material on the unoccupied storage layer in the at least one second storage layers, or take the material from one of the at least two first storage layers and place the material on the to-be-placed goods conveying layer.

13. An unloading device, comprising a robot, a conveyor, and a controller, wherein the robot comprises a goods taking or placing apparatus and at least two first storage layers, and the conveyor comprises a to-be-placed goods conveying layer and a to-be-taken goods conveying layer arranged in parallel from up to down, the robot is configured to take materials from a shelving unit in a warehouse and place the materials to the to-be-placed goods conveying layer, the to-be-placed goods conveying layer is configured to convey the materials from the robot to a workstation for sorting, and after the workstation completes sorting, the to-be-taken goods conveying layer is configured to convey a remained material from the workstation to the robot, the robot is further configured to take the remained material from the to-be-taken goods conveying layer and place on the at least two storage layers; and the controller is configured to: control the goods taking or placing apparatus to move in a direction perpendicular to the to-be-placed goods conveying layer and the to-be-taken goods conveying layer, and control, when the remained material obtained from the to-be-taken goods conveying layer exists on the goods taking or placing apparatus, the goods taking or placing apparatus to place the remained material on an unoccupied storage layer which is nearest to a location of the goods taking or placing apparatus;

wherein the controller is further configured to:

detect a quantity of materials on the to-be-taken goods conveying layer when no material exists on the at least one goods taking or placing apparatus, and at least one unoccupied storage layer exists in the at least two first storage layers;

when the material quantity exceeds a preset material quantity threshold, control the goods taking or placing apparatus to take the material from the to-be-taken goods conveying layer; and when the material quantity does not exceed the preset material quantity threshold, control the goods taking or placing apparatus to take the material from the to-be-taken goods conveying layer or take a material from one of the at least two first storage layers.

14. The unloading device according to claim 13, wherein the controller is configured to:

control the goods taking or placing apparatus to take the remained material from the to-be-taken goods conveying layer, when no material exists on the goods taking or placing apparatus, at least one unoccupied storage layer exists in the at least two first storage layers, and the remained material exists on the to-be-taken goods conveying layer; and control the goods taking or placing apparatus to take a material from one of the at least two first storage layers which is nearest to the location of the goods taking or placing apparatus when no material exists on the goods taking or placing apparatus and no unoccupied storage layer exists in the at least two first storage layers.

15. The unloading device according to claim 13, wherein the to-be-placed goods conveying layer comprises a first end configured to receive the material from the robot and a second end opposite to the first end;

the to-be-taken goods conveying layer comprises a first end used for the material to be taken, and a second end opposite to the first end;

the conveyor further comprises a connecting apparatus configured to convey the material from the second end of the to-be-placed goods conveying layer to the second end of the to-be-taken goods conveying layer.

16. The unloading device according to claim 15, wherein the connecting apparatus comprises a fourth storage layer capable of sliding from up and down, the fourth storage layer is configured to be docked with the second end of the to-be-placed goods conveying layer through sliding from up to down to obtain the material from the second end of the to-be-placed goods conveying layer, and to be docked with the second end of the to-be-taken goods conveying layer through sliding from up to down to place the material on the second end of the to-be-taken goods conveying layer.

17. The unloading device according to claim 13, wherein when the controller is configured to control the at least one goods taking or placing apparatus to move in a direction perpendicular to the to-be-placed goods conveying layer and the to-be-taken goods conveying layer, the controller is configured to:

control the at least one goods taking or placing apparatus to alternately move in a first vertical direction and a second vertical direction, wherein the movement in the first vertical direction comprises moving from a start storage layer to an end storage layer, and the movement in the second vertical direction comprises moving from the end storage layer to the start storage layer, wherein in an initial state, the start storage layer is an uppermost layer of the at least two first storage layers, and the end storage layer is a lowermost layer of the at least two first storage layers; and respectively update the start storage layer and the end storage layer to an uppermost layer and a lowermost layer of a to-be-taken material storage layer after the material is placed on one of the at least two first storage layers, wherein a to-be-taken material exists on the to-be-taken material storage layer.

18. The unloading device according to claim 13, wherein a temporary shelving unit is further arranged beside the conveyor, at least one second storage layer is arranged on the temporary shelving unit, and the at least one second storage layer is configured to receive the remained material taken from the to-be-taken goods conveying layer;

wherein the controller is further configured to:

detect the material on the to-be-taken goods conveying layer when no unoccupied storage layer exists in the at least two first storage layers;

when the material on the to-be-taken goods conveying layer exceeds a preset material quantity threshold and an unoccupied storage layer exists in the at least one second storage layer, control the goods taking or placing apparatus to take the material from the to-be-taken goods conveying layer and place the material on the unoccupied storage layer in the at least one second storage layer; and when the material on the to-be-taken goods conveying layer does not exceed the preset material quantity threshold, control the goods taking or placing apparatus to take the material from the to-be-taken goods conveying layer and place the material on the unoccupied storage layer in the at least one second storage layers, or take the material from one of the at least two first storage layers and place the material on the to-be-placed goods conveying layer.

19. A non-transitory computer-readable storage medium, applicable to an unloading device, wherein the unloading device comprises a robot and a conveyor, the robot comprises at least one goods taking or placing apparatus and at least two first storage layers, and the conveyor comprises a to-be-placed goods conveying layer and a to-be-taken goods conveying layer arranged in parallel from up to down, the robot is configured to take materials from a shelving unit in a warehouse and place the materials to the to-be-placed goods conveying layer, the to-be-placed goods conveying layer is configured to convey the materials from the robot to a workstation for sorting, and after the workstation completes sorting, the to-be-taken goods conveying layer is configured to convey a remained material from the workstation to the robot, the robot is further configured to take the remained material from the to-be-taken goods conveying layer and place on the at least two storage layers;

wherein the non-transitory computer-readable storage medium stores a computer-executable instruction, when executed by a processor, causing a computing device to implement the method of:

controlling the at least one goods taking or placing apparatus to move in a direction perpendicular to the to-be-placed goods conveying layer and the to-be-taken goods conveying layer;

controlling, when the remained material obtained from the to-be-taken goods conveying layer exists on a goods taking or placing apparatus, the goods taking or placing apparatus to place the remained material on an unoccupied storage layer which is nearest to a location of the goods taking or placing apparatus;

controlling the goods taking or placing apparatus to take the remained material from the to-be-taken goods conveying layer, when no material exists on the goods taking or placing apparatus, at least one unoccupied storage layer exists in the at least two first storage layers, and the remained material exists on the to-be-taken goods conveying layer; and controlling the goods taking or placing apparatus to take a material from one of the at least two first storage layers which is nearest to the location of the goods taking or placing apparatus when no material exists on the goods taking or placing apparatus and no unoccupied storage layer exists in the at least two first storage layers;

when no material exists on the at least one goods taking or placing apparatus, and at least one unoccupied storage layer exists in the at least two first storage layers, detecting a quantity of materials on the to-be-taken goods conveying layer;

when the material quantity exceeds a preset material quantity threshold, controlling the goods taking or placing apparatus to take the material from the to-be-taken goods conveying layer; and when the material quantity does not exceed the preset material quantity threshold, controlling the goods taking or placing apparatus to take the material from the to-be-taken goods conveying layer or take a material from one of the at least two first storage layers.

20. The non-transitory computer-readable storage medium according to claim 19, wherein a temporary shelving unit is further arranged beside the conveyor, at least one second storage layer is arranged on the temporary shelving unit, and the at least one second storage layer is configured to receive the remained material taken from the to-be-taken goods conveying layer;

wherein when the computer-executable instruction is executed by the processor, the computing device is further caused to implement the method of:

when no unoccupied storage layer exists in the at least two first storage layers, detecting the material on the to-be-taken goods conveying layer;

when the material on the to-be-taken goods conveying layer exceeds a preset material quantity threshold and an unoccupied storage layer exists in the at least one second storage layer, controlling the goods taking or placing apparatus to take the material from the to-be-taken goods conveying layer and place the material on the unoccupied storage layer in the at least one second storage layer; and when the material on the to-be-taken goods conveying layer does not exceed the preset material quantity threshold, controlling the goods taking or placing apparatus to take the material from the to-be-taken goods conveying layer and place the material on the unoccupied storage layer in the at least one second storage layers, or take the material from one of the at least two first storage layers and place the material on the to-be-placed goods conveying layer.

* * * * *